(12) United States Patent
Shibata et al.

(10) Patent No.: US 10,046,220 B2
(45) Date of Patent: Aug. 14, 2018

(54) SWING ANALYSIS DEVICE, NON-TRANSITORY COMPUTER-READABLE STORAGE MEDIUM STORING PROGRAM FOR ANALYZING SWING, AND SWING ANALYSIS SYSTEM

(71) Applicants: MIZUNO CORPORATION, Osaka-shi, Osaka (JP); AKITA UNIVERSITY, Akita-shi, Akita (JP)

(72) Inventors: Shohei Shibata, Osaka (JP); Takeshi Naruo, Osaka (JP); Kiyoshi Hirose, Akita (JP)

(73) Assignees: MIZUNO CORPORATION, Osaka (JP); AKITA UNIVERSITY, Akita (JP)

( * ) Notice: Subject to any disclaimer, the term of this patent is extended or adjusted under 35 U.S.C. 154(b) by 122 days.

(21) Appl. No.: 15/176,993

(22) Filed: Jun. 8, 2016

(65) Prior Publication Data

US 2016/0361594 A1  Dec. 15, 2016

(30) Foreign Application Priority Data

Jun. 10, 2015 (JP) .................... 2015-117548

(51) Int. Cl.
 *A63B 24/00* (2006.01)
 *A63B 69/00* (2006.01)
 (Continued)

(52) U.S. Cl.
 CPC ...... *A63B 69/0002* (2013.01); *G06K 9/00342* (2013.01); *G09B 19/00* (2013.01);
 (Continued)

(58) Field of Classification Search
 None
 See application file for complete search history.

(56) References Cited

U.S. PATENT DOCUMENTS

| | | | |
|---|---|---|---|
| 2012/0128203 A1 | 5/2012 | Nakaoka | |
| 2012/0316004 A1* | 12/2012 | Shibuya | A63B 24/0006 473/212 |
| 2016/0015972 A1* | 1/2016 | Hyde | H02J 7/025 607/48 |

FOREIGN PATENT DOCUMENTS

| | | |
|---|---|---|
| JP | 2011-142927 A | 7/2011 |
| JP | 2011142927 A | 7/2011 |

(Continued)

OTHER PUBLICATIONS

Office Action issued by the Japanese Patent Office for related Japanese Patent Application No. 2015-117548, dated Jun. 6, 2017.
(Continued)

*Primary Examiner* — Damon Pierce
(74) *Attorney, Agent, or Firm* — Troutman Sanders LLP; Daniel Sharpe

(57) ABSTRACT

A swing analysis device for analyzing a swing of a ball hitting tool includes: an information input unit configured to receive input of acceleration information and angular velocity information detected by a sensor attached to the ball hitting tool; a posture calculation unit configured to calculate posture information of the ball hitting tool in the swing by applying a predetermined filter to the acceleration information and the angular velocity information; a correction unit configured to correct the posture information of the ball hitting tool in the swing based on the posture information of the ball hitting tool at a first time in the swing; and a swing information calculation unit configured to calculate a swing trajectory of the ball hitting tool based on the acceleration information and the posture information of the ball hitting tool corrected by the correction unit.

7 Claims, 12 Drawing Sheets

(51) Int. Cl.
*G06K 9/00* (2006.01)
*G09B 19/00* (2006.01)
*A63B 71/06* (2006.01)
*A63B 102/32* (2015.01)
*A63B 102/02* (2015.01)
*A63B 102/04* (2015.01)
*A63B 102/18* (2015.01)

(52) U.S. Cl.
CPC ...... *G09B 19/0038* (2013.01); *A63B 71/0622* (2013.01); *A63B 2069/0008* (2013.01); *A63B 2071/065* (2013.01); *A63B 2071/0625* (2013.01); *A63B 2071/0647* (2013.01); *A63B 2102/02* (2015.10); *A63B 2102/04* (2015.10); *A63B 2102/18* (2015.10); *A63B 2102/182* (2015.10); *A63B 2102/32* (2015.10); *A63B 2208/0204* (2013.01); *A63B 2220/17* (2013.01); *A63B 2220/34* (2013.01); *A63B 2220/40* (2013.01); *A63B 2220/44* (2013.01); *A63B 2220/833* (2013.01); *A63B 2225/20* (2013.01); *A63B 2225/50* (2013.01)

(56) References Cited

FOREIGN PATENT DOCUMENTS

| JP | 2011-255016 A | 12/2011 |
| JP | 2012-254205 A | 12/2012 |

OTHER PUBLICATIONS

English translation of Office Action issued by the Japanese Patent Office for related Japanese Patent Application No. 2015-117548, dated Jun. 6, 2017.

Abe et al., "Inertial and Image Sensors Fusion for Estimation of Golf Swing Motion", Proceedings of the 59th Annual Conference of the Institute of Systems, Control and Information Engineers (ISCIE), May 20-22, 2015, Osaka, Japan.

* cited by examiner

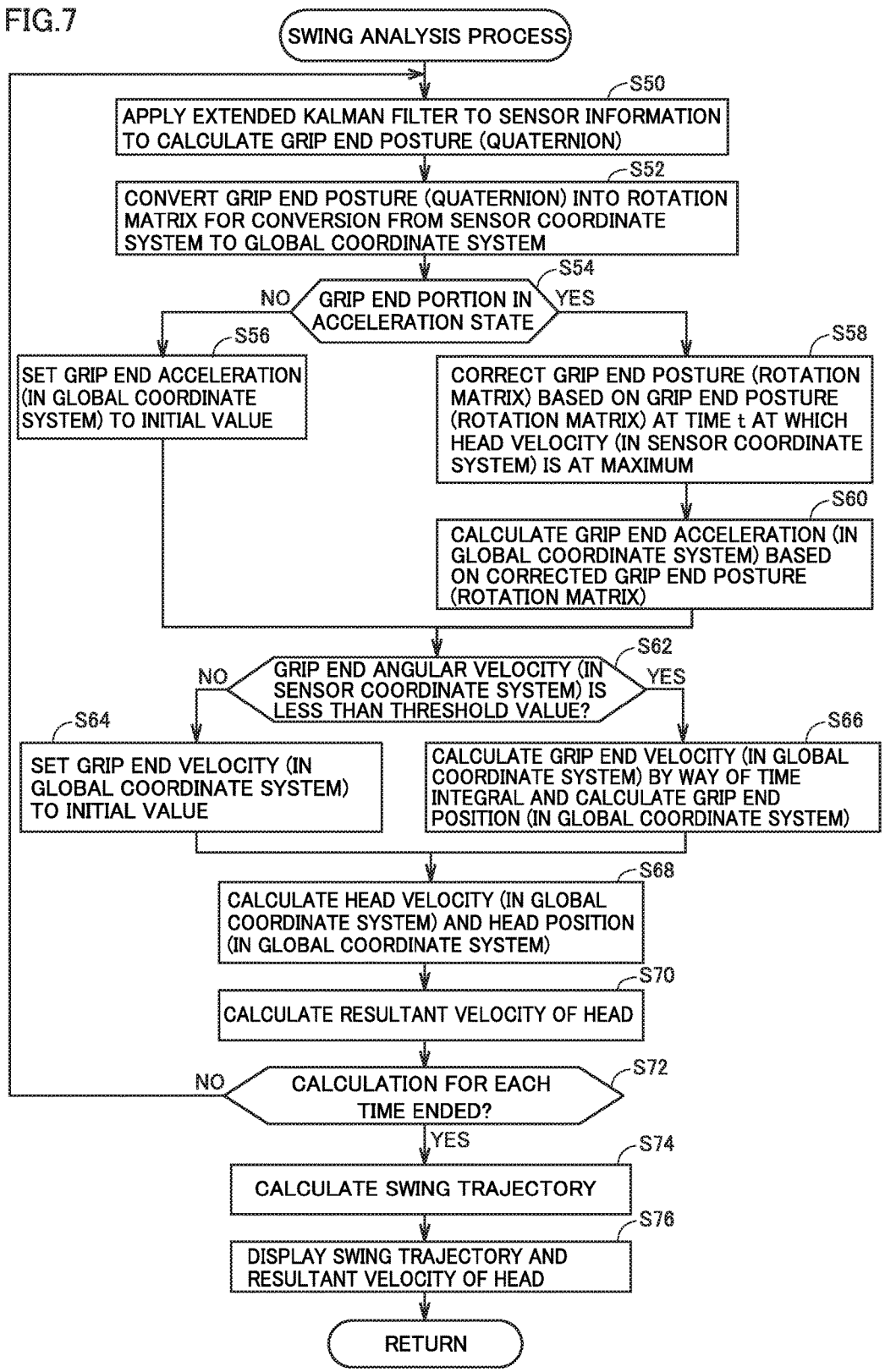

SWING ANALYSIS DEVICE, NON-TRANSITORY COMPUTER-READABLE STORAGE MEDIUM STORING PROGRAM FOR ANALYZING SWING, AND SWING ANALYSIS SYSTEM

This nonprovisional application is based on Japanese Patent Application No. 2015-117548 filed on Jun. 10, 2015 with the Japan Patent Office, the entire contents of which are hereby incorporated by reference.

BACKGROUND OF THE INVENTION

Field of the Invention

The present disclosure relates to a technique for analyzing a swing of a ball hitting tool.

Description of the Background Art

In sports using ball hitting tools such as a bat in baseball and a racket in tennis, capability of a player in swinging a ball hitting tool is an important index for gaining an advantage in a game or the like. Hence, it is expected that appropriate analysis on a swing of a player contributes to improvement in skill of the player as well as research and development of ball hitting tools.

For example, Japanese Patent Laying-Open No. 2011-142927 discloses a bat selection system including a sensor bat and a data analysis device. The data analysis device receives input of a type of goal to be achieved by a batter, receives data transmitted from the sensor bat, and calculates kinematics information for a bat swing based on the received data. Based on the input type of goal to be achieved by the batter and an evaluation parameter for the swing of the batter calculated by analyzing the kinematics information, the data analysis device selects an optimal bat for the batter and displays the selected bat and information associated with the evaluation parameter.

Japanese Patent Laying-Open No. 2011-142927 describes a configuration in which a bat trajectory is calculated using data from a gyro sensor and an acceleration sensor. However, in the technique of Japanese Patent Laying-Open No. 2011-142927, measurement errors will be increased due to accumulation of drift errors and integral errors when continuously measuring data of the sensors for a long time. Thus, a bat trajectory cannot be precisely calculated, disadvantageously. In view of this, according to the technique of Japanese Patent Laying-Open No. 2011-142927, precision in bat trajectory may become gradually worse when the subject continuously swings for a plurality of times.

SUMMARY OF THE INVENTION

The present disclosure has been made to solve the above problem, and an object in a certain aspect thereof is to provide a swing analysis device capable of analyzing each swing more precisely even when a subject continuously swings a ball hitting tool for a plurality of times.

An object in another aspect thereof is to provide a non-transitory computer-readable storage medium storing a program for causing a computer to analyze a swing, in order to analyze each swing more precisely even when a subject continuously swings a ball hitting tool for a plurality of times.

An object in still another aspect thereof is to provide a swing analysis system capable of analyzing each swing more precisely even when a subject continuously swings a ball hitting tool for a plurality of times.

According to a certain embodiment, a swing analysis device for analyzing a swing of a ball hitting tool is provided. The swing analysis device includes: an information input unit configured to receive input of acceleration information and angular velocity information detected by a sensor attached to the ball hitting tool; a posture calculation unit configured to calculate posture information of the ball hitting tool in the swing by applying a predetermined filter to the acceleration information and the angular velocity information; a correction unit configured to correct the posture information of the ball hitting tool in the swing based on the posture information of the ball hitting tool at a first time in the swing; and a swing information calculation unit configured to calculate a swing trajectory of the ball hitting tool based on the acceleration information and the posture information of the ball hitting tool corrected by the correction unit.

Preferably, among pieces of the posture information of the ball hitting tool in the swing, the correction unit corrects a piece of the posture information of the ball hitting tool during a certain period from a time before a second time to a time after the second time in the swing.

Preferably, when a velocity of the ball hitting tool calculated based on the angular velocity information is equal to or more than a reference threshold, the swing information calculation unit calculates the swing trajectory of the ball hitting tool based on the acceleration information and the corrected posture information of the ball hitting tool.

Preferably, the first time includes a time at which the velocity of the ball hitting tool calculated based on the angular velocity information is at maximum in the swing.

Preferably, the swing analysis device further includes a number calculation unit configured to calculate the number of swings of the ball hitting tool based on the number of times the velocity of the ball hitting tool calculated based on the angular velocity information reaches a predetermined velocity.

Preferably, the swing information calculation unit further calculates the maximum velocity of the head of the ball hitting tool in the swing based on the acceleration information and the posture information of the ball hitting tool corrected by the correction unit.

Preferably, the filter includes an extended Kalman filter.

According to another embodiment, a non-transitory computer-readable storage medium storing a program for causing a computer to analyze a swing of a ball hitting tool is provided. The program causes the computer to perform: receiving input of acceleration information and angular velocity information detected by a sensor attached to the ball hitting tool; calculating posture information of the ball hitting tool in the swing by applying a predetermined filter to the acceleration information and the angular velocity information; correcting the posture information of the ball hitting tool in the swing based on the posture information of the ball hitting tool at a predetermined time in the swing; and calculating a swing trajectory of the ball hitting tool based on the acceleration information and the corrected posture information of the ball hitting tool.

A swing analysis system according to still another embodiment includes: a sensor attached to a ball hitting tool; and a swing analysis device configured to analyze a swing of the ball hitting tool. The swing analysis device includes: an information input unit configured to receive input of acceleration information and angular velocity information detected by the sensor attached to the ball hitting tool; a posture calculation unit configured to calculate posture information of the ball hitting tool in the swing by applying a predetermined filter to the acceleration information and the angular velocity information; a correction unit configured to correct the posture information of the ball hitting tool in the swing based on the posture information of the ball hitting tool at a predetermined time in the swing; and a swing information calculation unit configured to calculate a swing trajectory of the ball hitting tool based on the acceleration information and the posture information of the ball hitting tool corrected by the correction unit.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 7 is a flowchart showing a flow of a swing analysis process performed by the swing analysis device according to the present embodiment.

DESCRIPTION OF THE PREFERRED EMBODIMENTS

Figure 1:
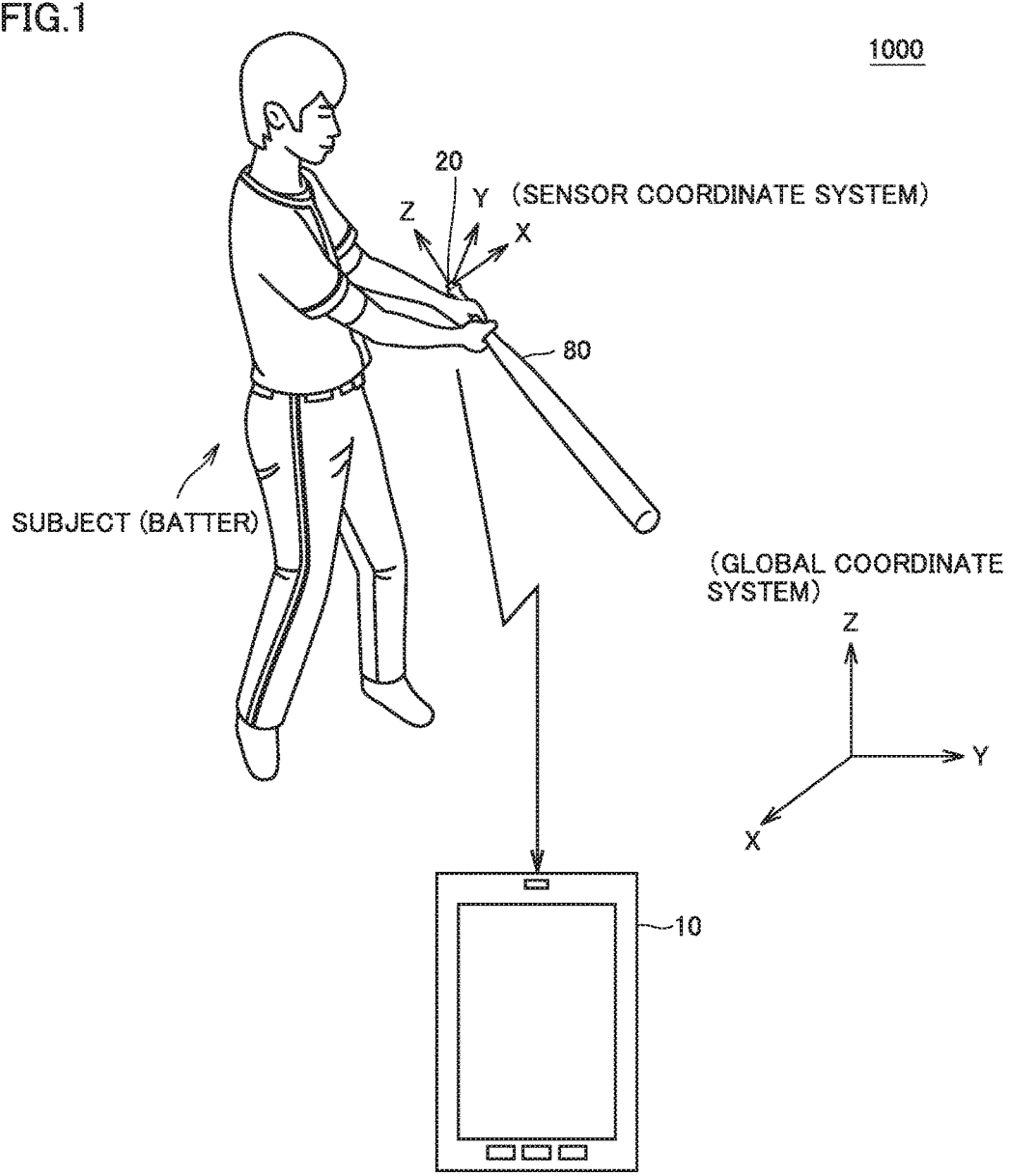
FIG. 1 illustrates an entire configuration of a swing analysis system according to the present embodiment.

Hereinafter, the present embodiment will be described. It should be noted that the same or corresponding components will be given the same reference characters and may not be described repeatedly.

It should be also noted that when referring to the number, an amount, or the like in the embodiment described below, the scope of the present invention is not necessarily limited to the number, the amount, or the like unless otherwise stated particularly. Moreover, in the embodiment below, each component is not necessarily essential for the present invention unless otherwise particularly stated.

<Configuration of System>

FIG. 1 illustrates an entire configuration of a swing analysis system according to the present embodiment. With reference to FIG. 1, a swing analysis system 1000 is a system for analyzing a swing of a ball hitting tool by a subject. Specifically, swing analysis system 1000 includes a swing analysis device 10 and a sensor device 20. In the present embodiment, it is assumed that the "ball hitting tool" is a bat 80 used in baseball, softball, or the like, and the subject is a right-handed batter. Also in the present embodiment, it is assumed that the subject (batter) swings the ball hitting tool (bat 80) once or more times as shown in FIG. 1.

Bat 80 may be any bat, such as a bat prepared by the batter or a bat prepared by a different person. Moreover, the batter may make a practice swing, may swing against a ball placed on a tee, or may swing against a thrown ball.

Swing analysis device 10 is constituted of a smartphone. However, swing analysis device 10 may be implemented as any device regardless of its type. For example, swing analysis device 10 may be a device such as a notebook PC (Personal Computer), a tablet terminal, a PDA (Personal Digital Assistance), a desktop PC, or the like.

Swing analysis device 10 communicates with sensor device 20 using wireless communication such as Bluetooth®, wireless LAN (Local Area Network), or infrared ray communication. It should be noted that swing analysis device 10 may be configured to be capable of communicating with sensor device 20 using wired communication such as USB (Universal Serial Bus).

Sensor device 20 includes: an angular velocity sensor capable of detecting angular velocities (hereinafter, also referred to as "angular velocity information") around three axes (the X axis, the Y axis, and the Z axis) orthogonal to one another; and an acceleration sensor capable of detecting accelerations (hereinafter, also referred to as "acceleration information") in the directions of the three axes (the X axis, the Y axis, and the Z axis) orthogonal to one another.

Moreover, sensor device 20 is attached to a grip end portion of bat 80 such that the acceleration sensor and angular velocity sensor of sensor device 20 are less affected by bat vibrations. Sensor device 20 is firmly fixed to the grip end portion so as not to move during a swing of bat 80. Preferably, the acceleration sensor included in sensor device 20 is provided on the longitudinal axis of bat 80 to avoid influence of centrifugal acceleration resulting from rotation around the longitudinal axis of bat 80. Here, it is assumed that the Z axis in the sensor coordinate system corresponds to the longitudinal axis of the bat, and the X axis and the Y axis can be appropriately set. Moreover, it is also assumed that the Z axis in the global coordinate system corresponds to the vertical direction, and the X axis and the Y axis can be appropriately set.

<Overview of Operation of System>

Figure 2:
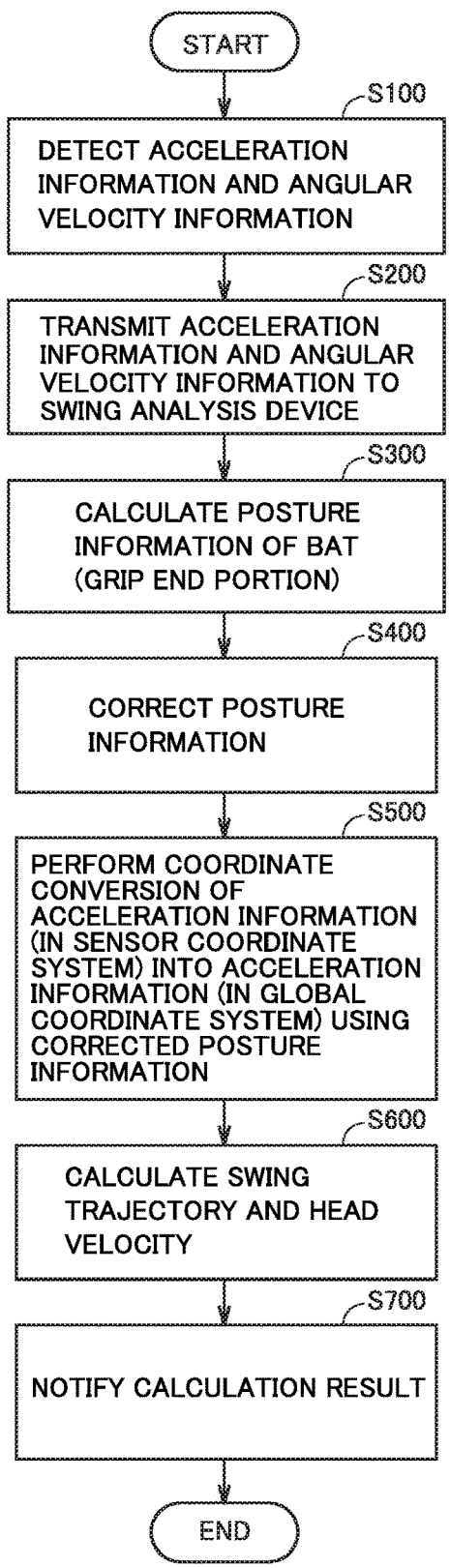
FIG. 2 is a flowchart for illustrating an overview of an operation of the swing analysis system according to the present embodiment.

FIG. 2 is a flowchart for illustrating an overview of an operation of swing analysis system 1000 according to the present embodiment.

With reference to FIG. 2, in swing analysis system 1000, sensor device 20 attached to the grip end portion of bat 80 detects acceleration information and angular velocity information in a time-series manner (step S100). Specifically, sensor device 20 detects angular velocity information and acceleration information in the sensor coordinate system (local coordinate system) for each sampling period (for example, 1 ms). Sensor device 20 transmits to swing analysis device 10 the angular velocity information and acceleration information detected for each sampling period (step S200).

Swing analysis device 10 applies an extended Kalman filter to the angular velocity information and acceleration information obtained from sensor device 20, thereby calculating posture information of sensor device 20 (the grip end portion of bat 80) (step S300). Swing analysis device 10 corrects the posture information in accordance with a method described later (step S400). Although details will be described later, the process of step S400 is a process for correcting an azimuth error of sensor device 20.

Using the corrected posture information, swing analysis device 10 performs coordinate conversion of (i) the acceleration information (in the sensor coordinate system) received from sensor device 20 into (ii) acceleration information in the global coordinate system (step S500). Then, swing analysis device 10 performs time integral of the acceleration information (in the global coordinate system) thus having been through the coordinate conversion, thereby calculating swing trajectory and head velocity (step S600). Swing analysis device 10 notifies the calculation result to the batter (step S700). Specifically, swing analysis device 10 displays, on a display, an image indicating the swing trajectory and the head velocity. Accordingly, the batter can check his/her swing trajectory and head velocity.

In swing analysis system 1000 according to the present embodiment, the posture information of sensor device 20 (grip end portion of bat 80) is corrected for each swing performed by the subject (step S400). Accordingly, even when the subject continuously swings for a plurality of times, an influence from accumulation of azimuth errors can be avoided, whereby an appropriate swing trajectory can be calculated for each swing.

The following provides detailed description of the above-described swing analysis system and a swing analysis method employed therein.

<Hardware Configuration>
(Swing Analysis Device 10)

Figure 3:
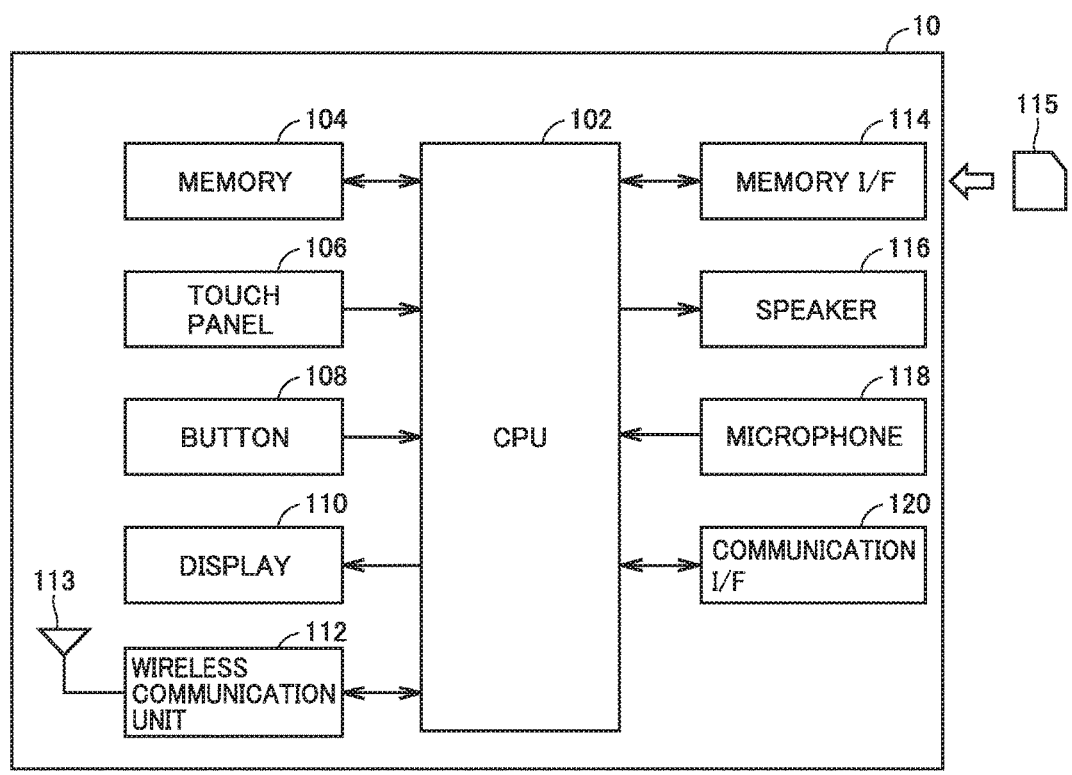
FIG. 3 is a block diagram showing a hardware configuration of the swing analysis device according to the present embodiment.

FIG. 3 is a block diagram showing a hardware configuration of swing analysis device 10 according to the present embodiment. With reference to FIG. 3, as main components, swing analysis device 10 includes a CPU (Central Processing Unit) 102, a memory 104, a touch panel 106, a button 108, a display 110, a wireless communication unit 112, a communication antenna 113, a memory interface (I/F) 114, a speaker 116, a microphone 118, and a communication interface (I/F) 120. Moreover, a storage medium 115 is an external storage medium.

CPU 102 reads and executes a program stored in memory 104, thereby controlling an operation of each component of swing analysis device 10. More specifically, CPU 102 executes the program to implement each of below-described processes (steps) of swing analysis device 10.

Memory 104 is implemented by a RAM (Random Access Memory), a ROM (Read-Only Memory), a flash memory, or the like. Memory 104 stores a program executed by CPU 102, data used by CPU 102, or the like.

Touch panel 106, which is provided on display 110 having a function as a display unit, may be of any type, such as a resistance film type or a capacitance type. Button 108 is provided at a surface of swing analysis device 10, receives an instruction from the user, and sends the instruction to CPU 102.

Wireless communication unit 112 is connected to a mobile communication network via communication antenna 113 to transmit/receive a signal for wireless communication. Accordingly, swing analysis device 10 can communicate with a predetermined external device via a mobile communication network such as third generation mobile communication systems (3G) or LTE (Long Term Evolution).

Memory interface (I/F) 114 reads data from external storage medium 115. That is, CPU 102 reads, via memory interface 114, data stored in external storage medium 115 and stores the data into memory 104. CPU 102 reads data from memory 104 and stores the data into external storage medium 115 via memory interface 114.

It should be noted that examples of storage medium 115 includes mediums configured to store programs in a nonvolatile manner, such as a CD (Compact Disc), a DVD (Digital Versatile Disk), a BD (Blu-Ray® Disc), a USB (Universal Serial Bus) memory, a memory card, a FD (Flexible Disk), and a hard disk.

Speaker 116 outputs a sound based on a command from CPU 102. Microphone 118 receives speech made to swing analysis device 10.

For example, communication interface (I/F) 120 is a communication interface for transmitting and receiving data between swing analysis device 10 and sensor device 20 and is implemented by an adapter, a connector, and the like. A communication method is, for example, Bluetooth®, wireless communication by a wireless LAN or the like, or wired communication using USB.

(Sensor Device 20)

Figure 4:
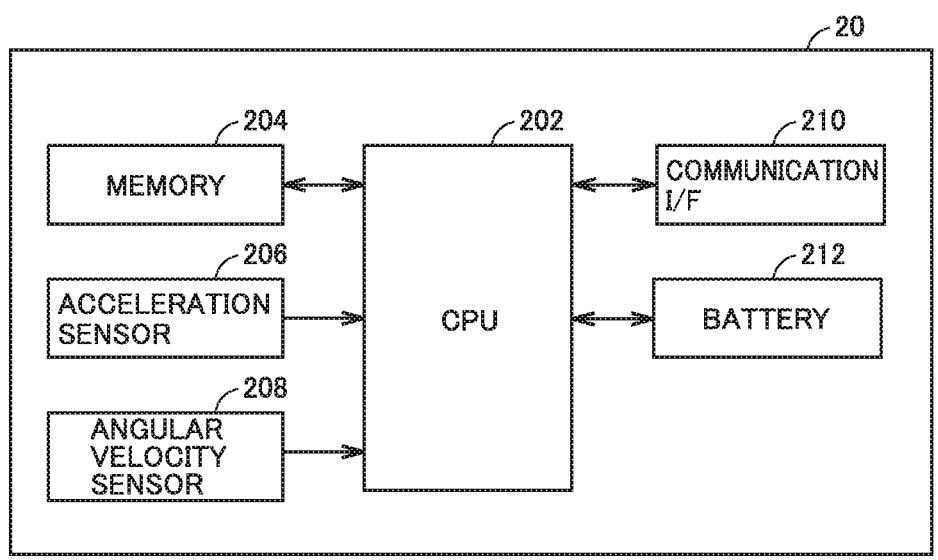
FIG. 4 is a block diagram showing a hardware configuration of a sensor device according to the present embodiment.

FIG. 4 is a block diagram showing a hardware configuration of sensor device 20 according to the present embodiment. With reference to FIG. 4, as main components, sensor device 20 includes: a CPU 202 configured to execute various processes; a memory 204 configured to store a program executed by CPU 202, data, and the like; an acceleration sensor 206 configured to be capable of detecting accelerations in the three axis directions; an angular velocity sensor 208 configured to be capable of detecting angular velocities around the three axes; a communication interface (I/F) 210 configured to communicate with swing analysis device 10; and a battery 212 configured to supply electric power to various components of sensor device 20.

<Functional Configuration>

Figure 5:
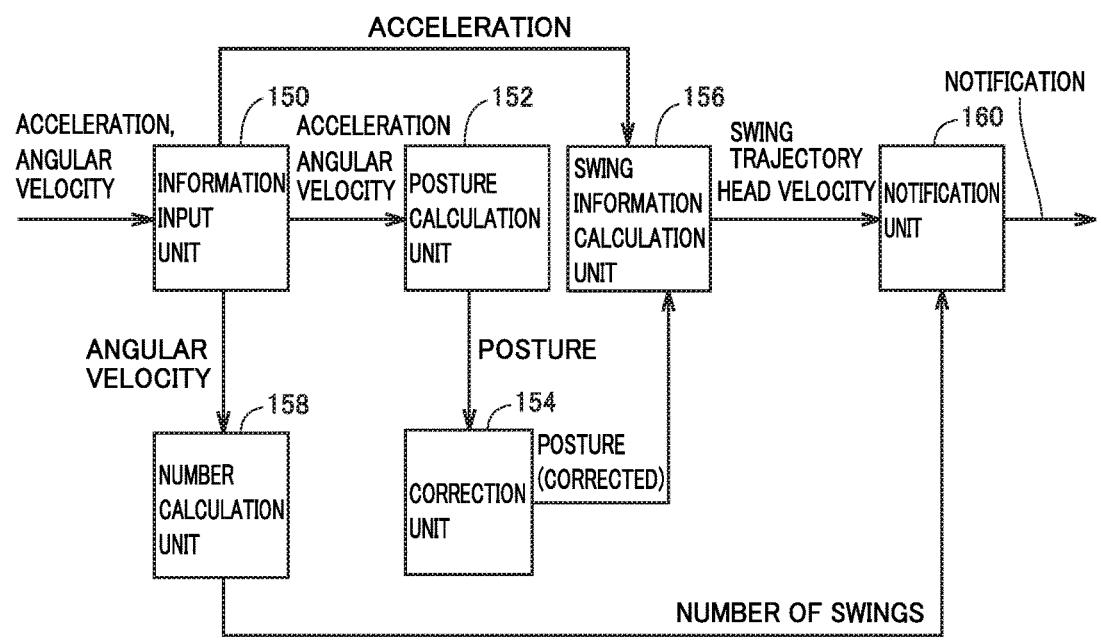
FIG. 5 is a function block diagram of the swing analysis device according to the present embodiment.

Next, the following describes a functional configuration for implementing swing analysis device 10. FIG. 5 is a function block diagram of swing analysis device 10 according to the present embodiment.

With reference to FIG. 5, swing analysis device 10 includes an information input unit 150, a posture calculation unit 152, a correction unit 154, a swing information calculation unit 156, a number calculation unit 158, and a notification unit 160. Basically, these are implemented by, for example, CPU 102 of swing analysis device 10 executing a program stored in memory 104 to provide instructions to components of swing analysis device 10. That is, CPU 102 functions as a control unit configured to control the entire operation of swing analysis device 10. It should be noted that part or all of these function configurations may be implemented by hardware.

Information input unit 150 receives input of acceleration information and angular velocity information both detected by sensor device 20 attached to bat 80. In the present embodiment, sensor device 20 is attached to the grip end portion of bat 80. Hence, information input unit 150 receives input of acceleration information and angular velocity information of the grip end portion. It should be noted that typically, information input unit 150 receives acceleration information and angular velocity information from sensor device 20 via communication interface 120. It should be also noted that information input unit 150 may receive input of these pieces of information via touch panel 106 (or button 108).

Posture calculation unit 152 applies a predetermined filter (extended Kalman filter in the present embodiment) to the acceleration information and angular velocity information of the grip end portion of bat 80, thereby calculating posture information of the grip end portion in the swing. Specifically, posture calculation unit 152 applies the predetermined filter to the acceleration information and angular velocity information, thereby calculating a quaternion indicating a posture of the grip end portion. Then, posture calculation unit 152 converts the quaternion into a rotation matrix for conversion from the sensor coordinate system to the global coordinate system. Thus, as the posture information of the grip end portion, posture calculation unit 152 calculates the rotation matrix corresponding to the quaternion.

Correction unit 154 corrects the posture information of the grip end portion in the swing based on the posture information (rotation matrix) of the grip end portion at a first time in the swing. The first time includes a time at which the velocity (in the sensor coordinate system) of the head portion of bat 80 calculated based on the length of bat 80 and the angular velocity information is at maximum in the swing. Alternatively, the first time may be a time at which the velocity (in the sensor coordinate system) of the head portion reaches a predetermined velocity (for example, 20 km/h) in the swing.

Among pieces of the posture information of the grip end portion in the swing, correction unit 154 corrects a piece of the posture information of the grip end portion during a certain period from a time before a second time to a time after the second time (past and future) in the swing. The second time is a time at which the velocity (in the sensor coordinate system) of the head portion reaches a predetermined velocity (for example, 20 km/h) in the swing. That is, the first time and the second time may be the same.

Swing information calculation unit 156 calculates a swing trajectory of bat 80 based on the acceleration information (in the sensor coordinate system) received by information input unit 150 and the posture information of the grip end portion corrected by correction unit 154.

Specifically, swing information calculation unit 156 employs the corrected posture information of the grip end portion to perform coordinate conversion of the acceleration information in the sensor coordinate system into acceleration information in the global coordinate system. Swing information calculation unit 156 calculates velocity information (in the global coordinate system) of the grip end portion from the acceleration information (in the global coordinate system) by way of time integral and calculates position information of the grip end portion (in the global coordinate system) by way of second-order time integral. Swing information calculation unit 156 calculates the position information of the head portion (in the global coordinate system) based on the length of bat 80 and the position information of the grip end portion (in the global coordinate system). Moreover, swing information calculation unit 156 can also calculate the maximum velocity of the head portion of bat 80 in the swing based on the length of bat 80 and the velocity information of the grip end portion (in the global coordinate system).

It should be noted that when the velocity (resultant velocity) of the grip end portion calculated based on the angular velocity information (in the sensor coordinate system) received by information input unit 150 is equal to or more than a threshold value Vth (for example, 10 rad/(sec)), swing information calculation unit 156 may calculate the swing trajectory of bat 80 by performing time integral as described above. Specifically, when the velocity (resultant angular velocity) of the grip end portion is less than threshold value Vth, it is considered that the subject does not swing and prepares for swing. If time integral is performed during the preparation of swing, integral errors are accumulated to presumably result in failing to obtain an appropriate swing trajectory. To address this, when it is estimated that the subject is swinging, swing information calculation unit 156 performs time integral to calculate the swing trajectory of bat 80.

Number calculation unit 158 calculates the number of swings of bat 80 based on the number of times the resultant velocity (in the sensor coordinate system) of the head portion of bat 80 calculated based on the length of bat 80 and the angular velocity information reaches the predetermined velocity (for example, 20 km/h). Preferably, the predetermined velocity is a velocity with which it can be estimated that a swing has been started.

Notification unit 160 notifies the calculation result (and calculation result of number calculation unit 158) of swing information calculation unit 156 to the subject. For example, notification unit 160 causes display 110 to display an image indicating the calculation result. Alternatively, notification unit 160 causes speaker 116 to output a sound indicating the calculation result.

<Details of Swing Analysis Process>

Next, the following provides detailed description of a flow of the swing analysis process performed by swing analysis device 10 according to the present embodiment. Generally, a batter actually starts a swing after performing a routine (which differs among batters) such as re-gripping a bat or moving a hand or foot. Swing analysis device 10 always receives sensor information (acceleration information and angular velocity information) from sensor device 20; however, a process load will be large if sensor information obtained when making a movement irrelevant to the actual swing as described above is also subjected to the calculation process. To address this, in order to reduce the process load, swing analysis device 10 is configured to perform the swing analysis process using sensor information obtained during a certain period from a time before the swing to a time after the swing.

Figure 6:
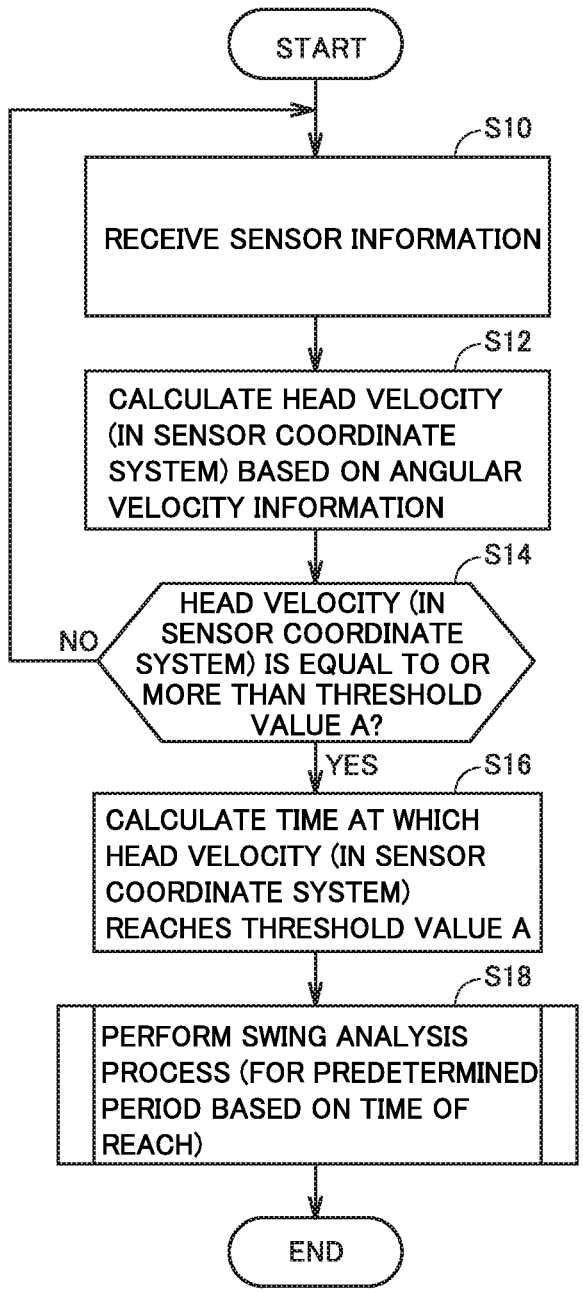
FIG. 6 is a flowchart showing a flow of a process performed by the swing analysis device according to the present embodiment.

FIG. 6 is a flowchart showing a flow of the process performed by swing analysis device 10 according to the present embodiment. Each of below-described steps is implemented by CPU 102 executing a program stored in memory 104. Moreover, sensor device 20 is attached to the grip end portion of bat 80 as described above. Hence, in the description below, an angular velocity detected by sensor device 20 will be referred to as "grip end angular velocity" and an acceleration detected by sensor device 20 will be referred to as "grip end acceleration".

With reference to FIG. 6, CPU 102 receives sensor information (acceleration information and angular velocity information) from sensor device 20 via communication interface 120 (step S10). It should be noted that CPU 102 sequentially stores received sensor information into memory 104 as time-series data.

CPU 102 calculates a head resultant velocity (in the sensor coordinate system) of bat 80 using the angular velocity information and below-described equations (1) to (3) (step S12). Specifically, in the sensor coordinate system, when it is assumed that angular velocities around the X axis, the Y axis, and the Z axis at the grip end portion are respectively indicated by $\omega_x$, $\omega_y$, and $\omega_z$, an angular velocity vector $\omega$ is indicated as in the following equation (1):

$$\omega = \begin{pmatrix} \omega_x \\ \omega_y \\ \omega_z \end{pmatrix} \qquad (1)$$

By using the equation (1) and a vector r of the head portion in the sensor coordinate system, a velocity vector $V_{hs}$ of the head portion is indicated as in the equation (2). It should be noted that $V_{hsx}$, $V_{hsy}$, and $V_{hsz}$ are respective velocities in the X axis, the Y axis, and the Z axis (the sensor coordinate system) at the head portion.

$$V_{hs} = \omega \times r = \begin{pmatrix} V_{hsx} \\ V_{hsy} \\ V_{hsz} \end{pmatrix} \quad (2)$$

From the equation (2), a resultant velocity $V_{hcs}$ of the head portion in the sensor coordinate system is derived as in the following equation (3):

$$V_{hcs} = \sqrt{V_{hsx}^2 + V_{hsy}^2 + V_{hsz}^2} \quad (3)$$

Next, CPU 102 determines whether or not resultant velocity $V_{hcs}$ (in the sensor coordinate system) of the head portion is equal to or more than a threshold value A (step S14). Threshold value A is set at a velocity with which it is estimated that a subject has started a swing, such as 20 km/h. It should be noted that threshold value A is stored in memory 104 and can be appropriately changed by the user.

When resultant velocity $V_{hcs}$ of the head portion is less than threshold value A, CPU 102 repeats the process from step S10. Specifically, CPU 102 determines that the subject has not started a swing, and does not transition to the next process. On the other hand, when resultant velocity $V_{hcs}$ of the head portion is equal to or more than threshold value A, CPU 102 calculates a time ts at which resultant velocity $V_{hcs}$ reaches threshold value A (step S16). Then, CPU 102 makes reference to memory 104, and performs the swing analysis process using time-series data of sensor information obtained during a predetermined period Ta from a time before time ts to a time after time ts (step S18). Predetermined period Ta is set to include a period from the start time of the swing to the end time of the swing. For example, predetermined period Ta is set as a period from a time one second before time ts to a time one second after time ts.

Hereinafter, the swing analysis process will be described in detail. FIG. 7 is a flowchart showing a flow of the swing analysis process performed by swing analysis device 10 according to the present embodiment. It should be noted that in the description below, it is assumed that time tx is a time at which resultant velocity $V_{hcs}$ (in the sensor coordinate system) of the head portion is at maximum during predetermined period Ta. Moreover, in the global coordinate system, the initial value of grip end acceleration $a_w$ is set at $a_w=(0, 0, 0)$, the initial value of grip end velocity $v_w$ is set at $v_w=(0, 0, 0)$, and the initial value of grip end position $p_w$ is set at $p_w=(0, 0, 0)$. It should be noted that when sensor device 20 is in a stationary state, the acceleration sensor detects gravity acceleration. Hence, it is assumed that the initial value of grip end acceleration $a_w$ is a value with a gravity acceleration of 1 g ($\approx 9.8$ m/s$^2$) being subtracted.

With reference to FIG. 7, CPU 102 applies an extended Kalman filter to the sensor information obtained at certain time t during predetermined period Ta so as to calculate (estimate) a quaternion indicating a posture (grip end posture) of the grip end portion at time t (step S50). Specifically, CPU 102 performs calculations described below.

CPU 102 receives (i) accelerations (in the sensor coordinate system) in the directions of the X axis, the Y axis, and the Z axis at the grip end portion and (ii) angular velocities (in the sensor coordinate system) around the X axis, the Y axis, and the Z axis at the grip end portion, and solves below-described nonlinear state equation (4) and nonlinear observation equation (5). It should be noted that j(t), F(j(t)), and W(t) in the equation (4) respectively indicate a state quantity, a linear model for time transition of the system, and system noise. Moreover, k(t), H(j(t)), and m(t) in the equation (5) respectively indicate an observation quantity, an observation model for linear mapping of a state space to an observation space, and observation noise.

$$j(t) = F(j(t)) + W(t) \quad (4)$$

$$k(t) = H(j(t)) + m(t) \quad (5)$$

Moreover, j(t) and F(j(t)) in the equation (4) are respectively indicated as in equations (6) and (7-1) or (7-2). Moreover, q(t) in the equation (6) is the quaternion indicating the grip end posture at certain time t during predetermined period Ta. $T_s$ in the equations (7-1) and (7-2) is the sampling period in sensor device 20. It should be noted that the equation (7-2) is an equation in which bias errors $b_x$, $b_y$, $b_z$ of sensor device 20 are taken into consideration with regard to the equation (7-1).

$$j(t) = q(t) = \begin{pmatrix} q_1(t) \\ q_2(t) \\ q_3(t) \\ q_4(t) \end{pmatrix} \quad (6)$$

$$F(j(t)) = \begin{pmatrix} q_1(t) \\ q_2(t) \\ q_3(t) \\ q_4(t) \end{pmatrix} + \frac{1}{2} \times \begin{pmatrix} -q_4(t) & -q_3(t) & q_2(t) \\ q_3(t) & -q_4(t) & -q_1(t) \\ -q_2(t) & q_1(t) & -q_4(t) \\ q_1(t) & q_2(t) & q_3(t) \end{pmatrix} \times \begin{pmatrix} \omega_x \\ \omega_y \\ \omega_z \end{pmatrix} \times T_s \quad (7\text{-}1)$$

$$F(j(t)) = \begin{bmatrix} \begin{pmatrix} q_1(t) \\ q_2(t) \\ q_3(t) \\ q_4(t) \end{pmatrix} + \frac{1}{2} \times \begin{pmatrix} -q_4(t) & -q_3(t) & q_2(t) \\ q_3(t) & -q_4(t) & -q_1(t) \\ -q_2(t) & q_1(t) & -q_4(t) \\ q_1(t) & q_2(t) & q_3(t) \end{pmatrix} \times \\ \begin{pmatrix} \omega_x - b_x \\ \omega_y - b_y \\ \omega_z - b_z \end{pmatrix} \times T_s \\ b_x \\ b_y \\ b_z \end{bmatrix} \quad (7\text{-}2)$$

Further, k(t) and H(j(t)) in the equation (5) are respectively indicated as in equations (8) and (9). Rq(t) in the equation (9) is obtained by converting q(t) (quaternion) into the rotation matrix for conversion from the sensor coordinate system to the global coordinate system.

$$k(t) = \begin{pmatrix} a_x(t) \\ a_y(t) \\ a_z(t) \end{pmatrix} \quad (8)$$

$$H(j(t)) = Rq(t)^T \times \begin{pmatrix} 0 \\ 0 \\ g \end{pmatrix} \quad (9)$$

By using the equations (4) to (9) mentioned above, quaternion q(t) is derived which indicates the grip end posture at certain time t during predetermined period Ta.

A quaternion is a vector composed of four variables including three imaginary numbers q1, q2, and q3 and one real number q4. In a posture representation with roll, pitch, and yaw, there is a singularity problem such as gimbal lock; however, in the quaternion, there is no singularity and all the postures can be represented.

Next, CPU 102 converts the derived grip end posture q(t) into the rotation matrix for conversion from the sensor coordinate system to the global coordinate system (step S52). Specifically, Rq(t) (hereinafter, also referred to as "grip end posture (rotation matrix) Rq(t)"), which is obtained by converting the grip end posture (quaternion) at time t for conversion from the sensor coordinate system to the rotation matrix in the global coordinate system, is indicated as in the following equation (10):

$$Rq(t) = \begin{pmatrix} 1 - 2q_2(t)^2 - 2q_3(t)^2 & 2(q_1(t)q_2(t) - q_3(t)q_4(t)) & 2(q_1(t)q_4(t) - q_2(t)q_4(t)) \\ 2(q_1(t)q_2(t) - q_3(t)q_4(t)) & 1 - 2q_1(t)^2 - 2q_3(t)^2 & 2(q_2(t)q_3(t) - q_1(t)q_4(t)) \\ 2(q_2(t)q_4(t) - q_1(t)q_3(t)) & 2(q_2(t)q_3(t) - q_1(t)q_4(t)) & 1 - 2q_1(t)^2 - 2q_2(t)^2 \end{pmatrix} \quad (10)$$

Next, at time t, CPU 102 determines whether or not the grip end portion is in an acceleration state (step S54). Specifically, at time t, CPU 102 determines whether or not the resultant acceleration of the grip end portion (in the sensor coordinate system) satisfies an equation (11) below. It should be noted that $a_x(t)$, $a_y(t)$, and $a_z(t)$ in the equation (11) are respective accelerations in the directions of the X axis, the Y axis, and the Z axis (the sensor coordinate system) at the grip end portion at time t.

$$0.9 < \sqrt{a_x(t)^2 + a_y(t)^2 + a_z(t)^2} < 1.2 \quad (11)$$

The equation (11) employs such a fact that when sensor device 20 is in a stationary state, the acceleration sensor detects a gravity acceleration of 1 g ($\approx$9.8 m/s²). Specifically, when the resultant acceleration of the grip end portion is around 1 g (when the equation (11) is satisfied), it can be assumed that the grip end portion is not in the acceleration state. On the other hand, when the resultant acceleration of the grip end portion is not around 1 g (when the equation (11) is not satisfied), it can be assumed that the grip end portion is in the acceleration state. In view of this, the lower limit threshold value (0.9) and the upper limit threshold (1.2) in the equation (11) may be values other than these as long as they are values around 1.

Next, when the grip end portion is not in the acceleration state at time t (NO in step S54), CPU 102 sets, to the initial value, grip end acceleration $a_W(t)$ in the global coordinate system at time t (step S56). Specifically, CPU 102 sets $a_W(t)=(0, 0, 0)$.

On the other hand, when the grip end portion is the acceleration state at time t (YES in step S54), CPU 102 corrects grip end posture (rotation matrix) Rq(t) at time t based on grip end posture (rotation matrix) Rq at time tx at which the head velocity (in the sensor coordinate system) is at maximum (step S58). Specifically, CPU 102 performs calculations as follows.

First, it is assumed that quaternion q indicating the grip end posture at time tx is indicated as in the following equation (12):

$$q = \begin{pmatrix} q_1 \\ q_2 \\ q_3 \\ q_4 \end{pmatrix} \quad (12)$$

Accordingly, Rq, which is obtained by converting the grip end posture (quaternion) at time tx into the rotation matrix based on the equation (10), is indicated as in the following equation (13):

$$Rq = \begin{pmatrix} 1 - 2q_2^2 - 2q_3^2 & 2(q_1q_2 + q_3q_4) & 2(q_1q_4 - q_2q_4) \\ 2(q_1q_2 - q_3q_4) & 1 - 2q_1^2 - 2q_3^2 & 2(q_2q_3 + q_1q_4) \\ 2(q_2q_4 + q_1q_3) & 2(q_2q_3 - q_1q_4) & 1 - 2q_1^2 - 2q_2^2 \end{pmatrix} \quad (13)$$

Rotation matrix Rz indicating rotation around the Z axis at time tx is indicated as in the following equation (14) with the rotation angle being represented by $\theta$:

$$Rz = \begin{pmatrix} \cos\theta & -\sin\theta & 0 \\ \sin\theta & \cos\theta & 0 \\ 0 & 0 & 1 \end{pmatrix} \quad (14)$$

It should be noted that rotation angle $\theta$ is indicated as in the following equation (15):

$$\theta = \arctan\left(\frac{2(q_1q_2 - q_3q_4)}{1 - 2q_2^2 - 2q_3^2}\right) \quad (15)$$

By multiplying grip end posture (rotation matrix) Rq(t) by transposed matrix $Rz^T$ of rotation matrix Rz, grip end posture (rotation matrix) Rq(t) at time t is corrected. Specifically, time tx at which the head velocity (in the sensor coordinate system) is at maximum is generally around the time of impact in batting (time at which both the shoulders of the batter are substantially in parallel with the bat). Hence, grip end posture (rotation matrix) Rq(t) at time t is corrected based on the grip end posture (rotation matrix) obtained at that time (corresponding to time tx) at which the grip end portion is assumed to face the front during the batting. Accordingly, azimuth errors resulting from a plurality of swings are reset, whereby the swing trajectory can be calculated with high precision.

Next, CPU 102 calculates grip end acceleration $a_W(t)$ in the global coordinate system based on (i) grip end accelerations $a_x(t)$, $a_y(t)$, and $a_z(t)$ in the three axis directions in the sensor coordinate system and (ii) corrected grip end posture (rotation matrix) Rq(t) (step S60). Specifically, CPU 102 calculates grip end acceleration $a_W(t)$ using the following equation (16):

$$a_w(t) = Rz^T \times Rq(t) \times \begin{pmatrix} a_x(t) \\ a_y(t) \\ a_z(t) \end{pmatrix} + \begin{pmatrix} 0 \\ 0 \\ g \end{pmatrix} \quad (16)$$

It should be noted that as described above, the acceleration sensor detects gravity acceleration. Hence, as shown in the equation (16), the gravity acceleration is subtracted in the case of coordinate conversion from the grip end acceleration in the sensor coordinate system to the grip end acceleration in the global coordinate system.

Next, at time t, CPU 102 determines whether or not resultant angular velocity $V_{cs}$ (in the sensor coordinate system) of the grip end portion is less than threshold value Vth (step S62). It should be noted that resultant angular velocity $V_{cs}(t)$ of the grip end portion at time t is indicated as in the following equations (17):

$$V_{cs}(t) = \sqrt{\omega_x(t)^2 + \omega_y(t)^2 + \omega_z(t)^2} \tag{17}$$

When resultant angular velocity $V_{cs}(t)$ of the grip end portion is less than threshold value Vth at time t (NO in step S62), CPU 102 sets, to the initial value, grip end velocity $v_w(t)$ in the global coordinate system at time t (step S64). Specifically, CPU 102 sets $v_w(t)=(0, 0, 0)$.

On the other hand, when resultant angular velocity $V_{cs}$ of the grip end portion is equal to or more than threshold value Vth at time t (YES in step S62), CPU 102 calculates grip end velocity $v_w(t)$ by way of time integral of grip end acceleration $a_w(t)$, and calculates grip end position $p_w(t)$ in the global coordinate system by way of double integral (step S66).

Next, CPU 102 calculates head velocity $v_{hw}(t)$ and head position $p_{hw}(t)$ at time t in the global coordinate system based on grip end velocity $v_w(t)$ and grip end position $p_w(t)$ (step S68). Specifically, head velocity $v_{hw}(t)$ is indicated as in an equation (18) and head position $p_{hw}(t)$ is indicated as in an equation (19) as follows:

$$v_{hw}(t) = v_w(t) + Rq(t) \times (\omega(t) \times r) \tag{18}$$

$$p_{hw}(t) = p_w(t) + Rq(t) \times r \tag{19}$$

Next, CPU 102 calculates head resultant velocity $V_{hcw}(t)$ at time t, using the following equation (20) that is based on grip end velocities $v_{hwx}(t)$, $v_{hwy}(t)$, $v_{hwz}(t)$ in the three axis directions in the global coordinate system (step S70):

$$V_{hcw}(t) = \sqrt{v_{hwx}(t)^2 + v_{hwy}(t)^2 + v_{hwz}(t)^2} \tag{20}$$

Next, CPU 102 determines whether or not the series of processes from step S50 to step S70 have been performed for each of pieces of sensor data at respective times in predetermined period Ta (time-series data of acceleration and angular velocity) (step S72). When the series of processes have not been performed for all the time-series data (NO in step S72), CPU 102 repeats the series of processes at a time other than time t.

On the other hand, when the series of processes have been performed for all the time-series data (YES in step S72), CPU 102 calculates a swing trajectory based on the time-series data of the grip end position ($p_w(t)$ to $p_w(t \pm n)$) and the time-series data of the head position ($p_{hw}(t)$ to $p_{hw}(t \pm n)$) (step S74). Then, CPU 102 displays the swing trajectory and the time-series head resultant velocity on display 110 (step S76). Then, the process is ended.

Example

The inventor of the present application examined validity of the swing analysis method mentioned above. With reference to FIG. 8A to FIG. 12B, results of the examination will be described. The examination was performed by comparing (i) swing trajectory and head resultant velocity (hereinafter, simply referred to as "head velocity") in the case of employing the swing analysis method (hereinafter, simply referred to as "the present analysis method") according to the present embodiment with (ii) swing trajectory and head velocity in the case of employing a swing analysis method (comparative example analysis method) according to a comparative example. Here, the comparative example analysis method is an analysis method in which the posture calculation process (corresponding to step S50) of applying the extended Kalman filter and the azimuth compensation process (step S58) for sensor device 20 are not performed. It should be noted that as the sensor device, a motion sensor provided by Logical Product Corporation was used.

Moreover, in the present example, a right-handed subject continuously swung for twenty times, and swing trajectory and head velocity were calculated for each swing. It should be noted that each of the actual swings by the subject was such that the bat was gradually changed from a standing state to a lying state.

(Swing Trajectory)

Figure 8A:
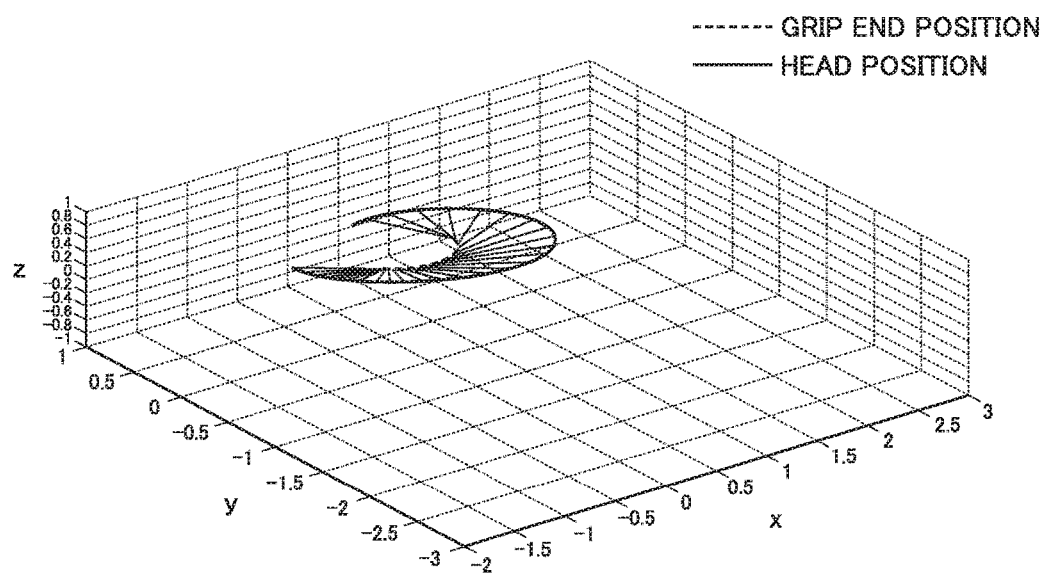
FIGS. 8A and 8B show respective swing trajectories (in the first swing) calculated using swing analysis methods.
Figure 8B:
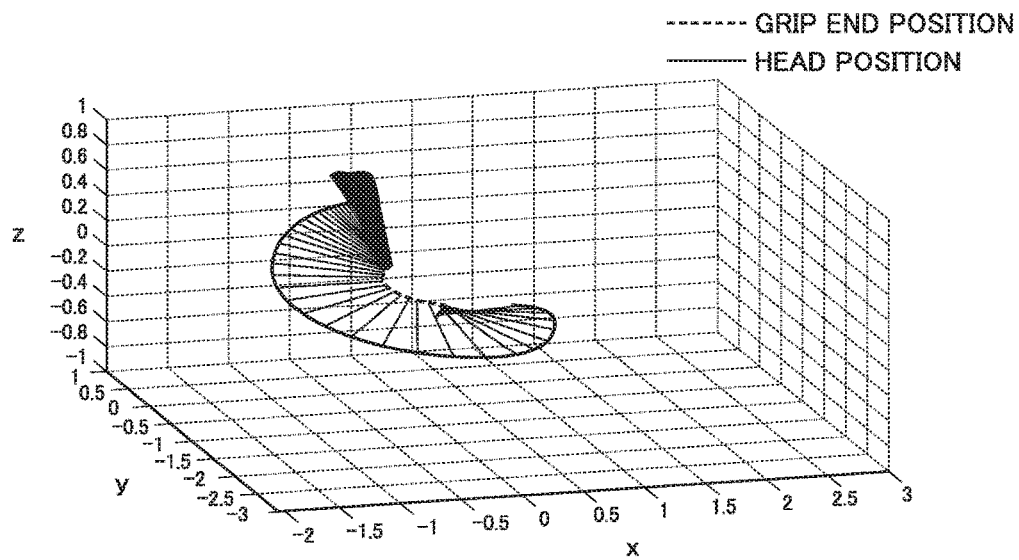

FIGS. 8A and 8B show respective swing trajectories (in the first swing) calculated using the swing analysis methods. Specifically, FIG. 8A shows a swing trajectory (in the first swing) calculated using the comparative example analysis method. FIG. 8B shows a swing trajectory (in the first swing) calculated using the present analysis method.

With reference to FIG. 8A, it can be confirmed that the standing state of the bat was not reflected as if the swing had been performed with the bat being in the lying state from the beginning. That is, the swing trajectory calculated using the comparative example analysis method failed to reflect the actual swing by the subject.

On the other hand, with reference to FIG. 8B, it can be confirmed that the swing was performed with the bat being gradually changed from the standing state to the lying state. That is, the swing trajectory calculated using the present analysis method precisely reflected the actual swing by the subject.

Figure 9A:
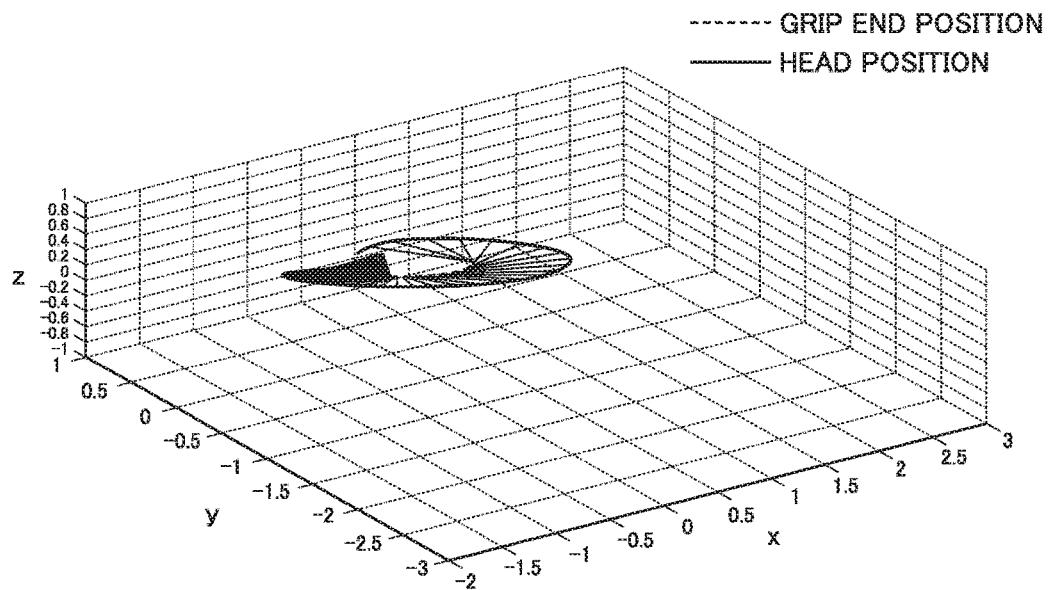
FIGS. 9A and 9B show respective swing trajectories (in the fifth swing) calculated using the swing analysis methods.
Figure 9B:
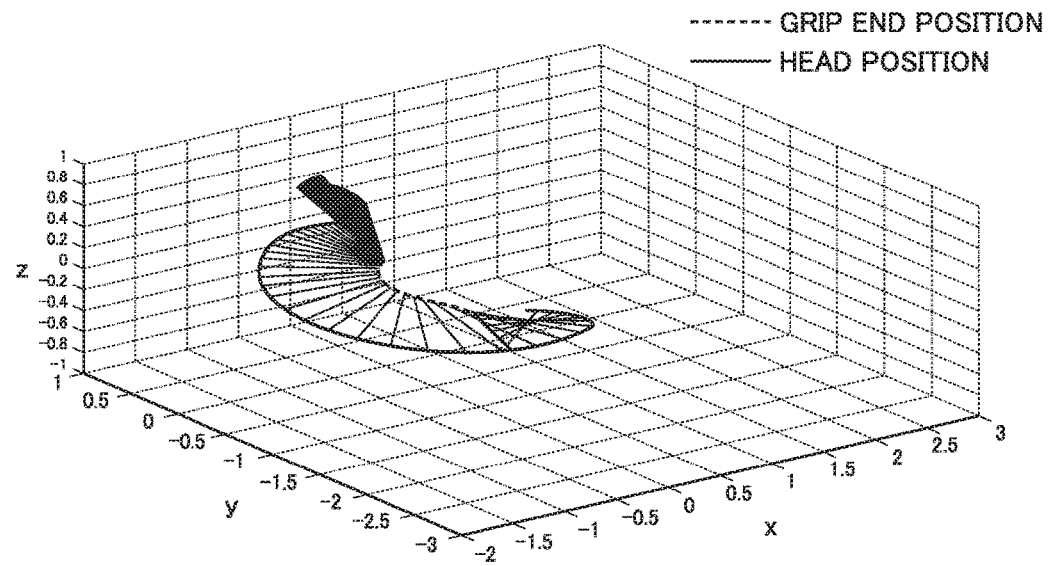

FIGS. 9A and 9B show respective swing trajectories (in the fifth swing) calculated using the swing analysis methods. Specifically, FIG. 9A shows a swing trajectory (in the fifth swing) calculated using the comparative example analysis method. FIG. 9B shows a swing trajectory (in the fifth swing) calculated using the present analysis method.

As with the swing trajectory of the first swing (FIG. 8A), the swing trajectory (FIG. 9A) calculated using the comparative example analysis method failed to reflect the actual swing by the subject (the fact that the bat was gradually changed from the standing state to the lying state during the swing). On the other hand, as with the swing trajectory of the first swing, the swing trajectory calculated using the present analysis method (FIG. 9B) precisely reflected the actual swing by the subject.

Figure 10A:
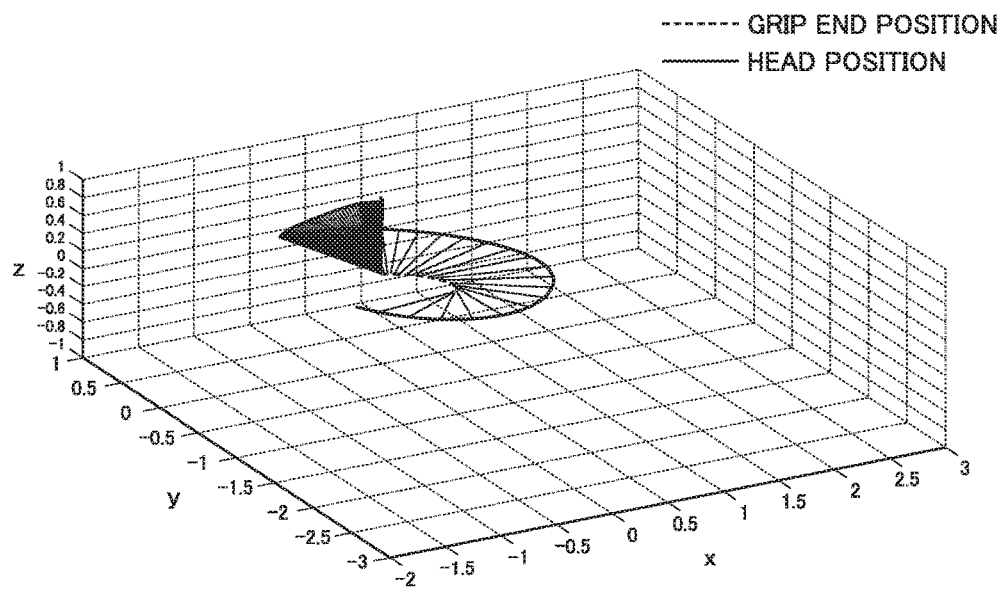
FIGS. 10A and 10B show respective swing trajectories (in the twentieth swing) calculated using the swing analysis methods.
Figure 10B:
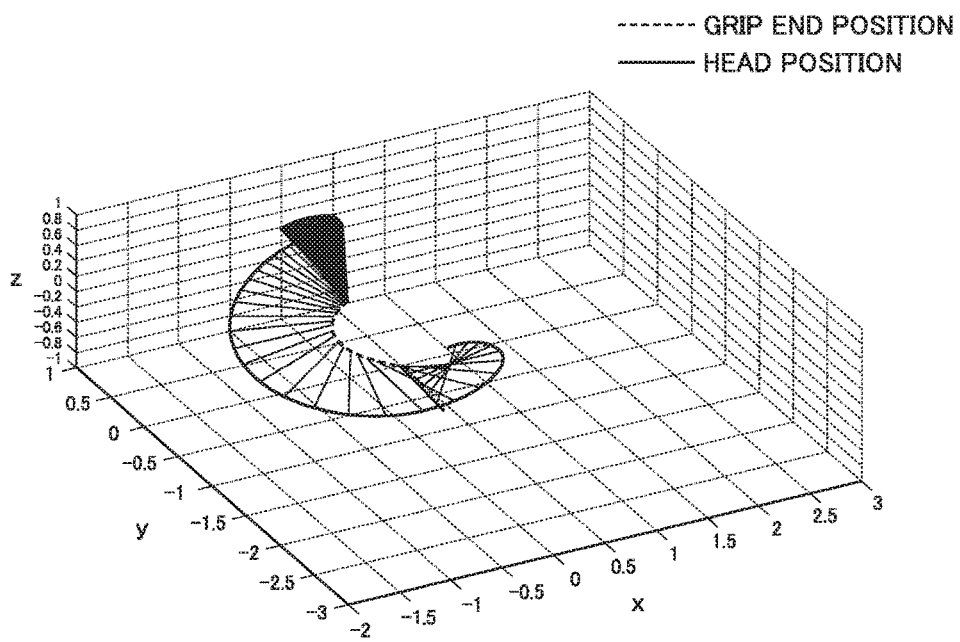

FIGS. 10A and 10B show respective swing trajectories (in the twentieth swing) calculated using the swing analysis methods. Specifically, FIG. 10A shows a swing trajectory (in the twentieth swing) calculated using the comparative example analysis method. FIG. 10B shows a swing trajectory (in the twentieth swing) calculated using the present analysis method.

The swing trajectory calculated using the comparison analysis method (FIG. 10A) looked as if a left-handed subject had swung rather than the right-handed subject, and therefore became completely different from the swing trajectory of the actual swing.

On the other hand, as with the swing trajectories of the first and fifth swings, the swing trajectory calculated using the present analysis method (FIG. 10B) precisely reflected the actual swing by the subject. In view of this fact, according to the present analysis method, the actual swings by the subject can be precisely reflected irrespective of the number of swings.

According to the results of FIG. 8A to FIG. 10B, in the comparative example method, no posture calculation was performed using the extended Kalman filter. Hence, in the first place, it is considered that the posture of the bat (sensor device) could not be estimated precisely. Further, in the comparative example analysis method, the azimuth correction of sensor device 20 was not also performed. Hence, it is considered that the result was greatly affected by azimuth errors resulting from re-gripping of the bat before the subject swung, with the result that the calculated swing trajectory became completely different from the actual swing trajectory. According to the present analysis method, the posture of the bat can be precisely estimated and an element affecting the azimuth errors, such as the re-gripping of the bat, can be eliminated, whereby a swing trajectory close to the actual swing trajectory can be calculated.

(Head Velocity)

Figure 11A:
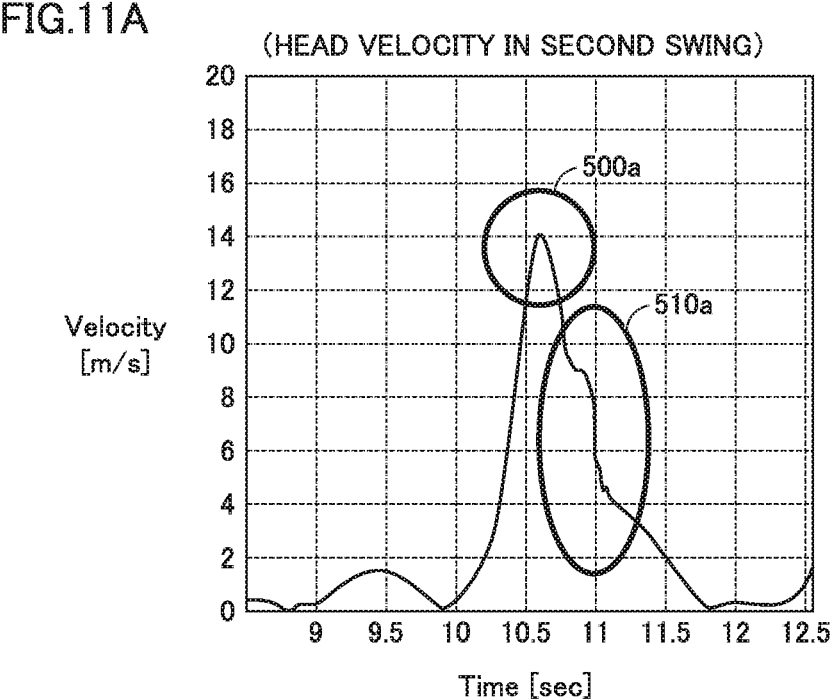
FIGS. 11A and 11B show head velocities calculated using the swing analysis method according to the comparative example.
Figure 11B:
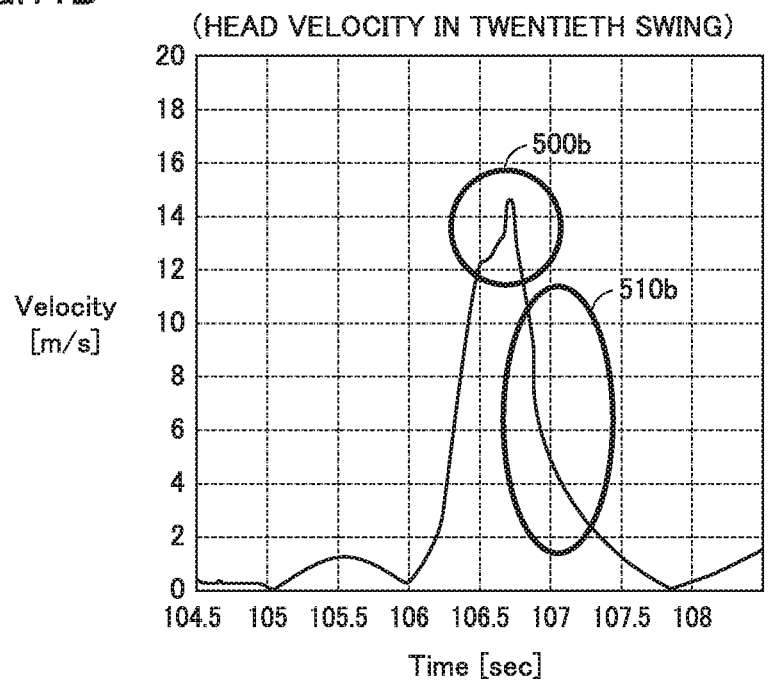

FIGS. 11A and 11B show head velocities calculated using the swing analysis method according to the comparative example. Specifically, FIG. 11A shows a head velocity of the second swing. FIG. 11B shows a head velocity of the twentieth swing.

Figure 12A:
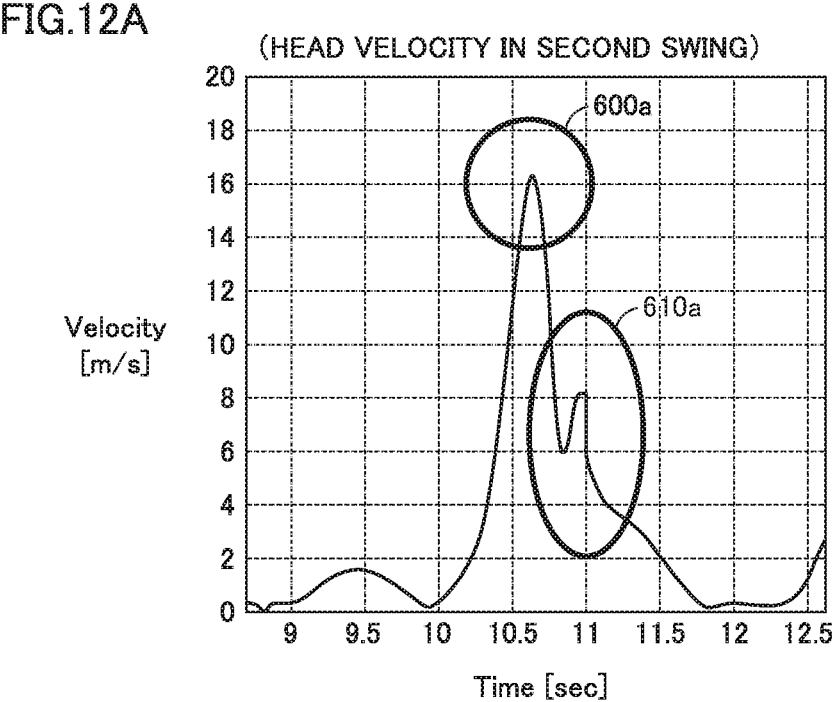
FIGS. 12A and 12B show head velocities calculated using the swing analysis method according to the present embodiment.
Figure 12B:
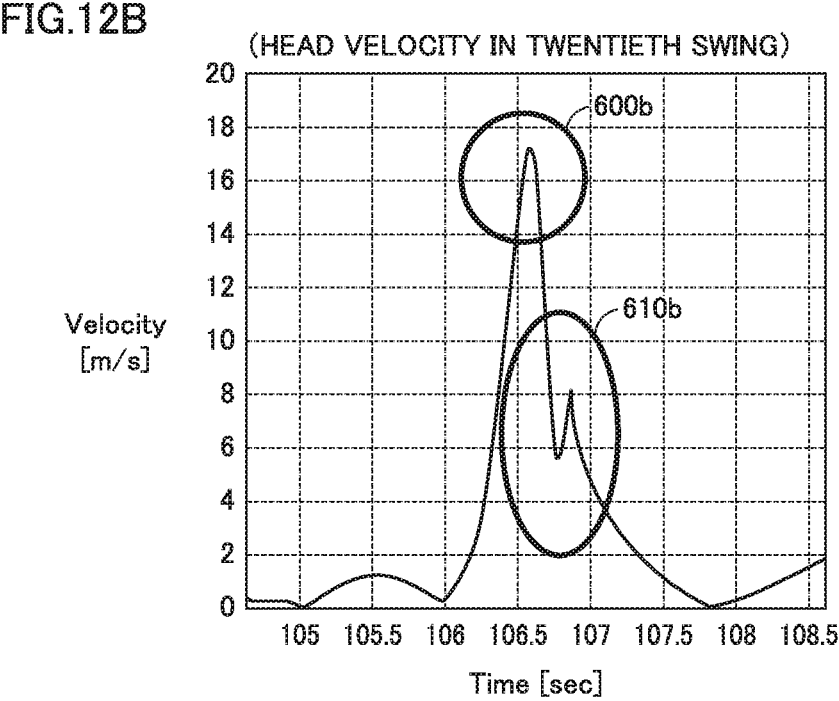

FIGS. 12A and 12B show head velocities calculated using the swing analysis method according to the present embodiment. Specifically, FIG. 12A shows a head velocity of the second swing. FIG. 12B shows a head velocity of the twentieth swing.

First, with reference to FIGS. 11A and 11B, in view of the head maximum velocities (region 500a of FIG. 11A and region 500b of FIG. 11B) calculated using the swing analysis method according to the comparative example, the shape of the curve in the second swing was different from that in the twentieth swing, thus confirming an error. Similarly, in view of changes in head velocities (region 510a of FIG. 11A and region 510b of FIG. 11B), timing of decrease in head velocity in the second swing was different from that in the twentieth swing, thus confirming an error. That is, in the swing analysis method according to the comparative example, a larger number of swings resulted in an imprecisely calculated head velocity.

Next, with reference to FIGS. 12A and 12B, in view of the head maximum velocities (region 600a of FIG. 12A and region 600b of FIG. 12B) calculated using the swing analysis method according to the present embodiment, it can be confirmed that the shape of the curve in the second swing was substantially the same as that in the twentieth swing. Likewise, in view of changes in the head velocities (region 610a of FIG. 12A and region 610b of FIG. 12B), timing of decrease in head velocity in the second swing was substantially the same as that in the twentieth swing. That is, in the swing analysis method according to the present embodiment, even a larger number of swings resulted in a precisely calculated head velocity.

Other Embodiment

In the embodiment mentioned above, it has been illustrated that the ball hitting tool is a bat; however, the ball hitting tool is not limited to such a configuration. For example, sports such as baseball, tennis, golf, and badminton are similar in that subjects swing ball hitting tools. Hence, the ball hitting tool may be a racket used in tennis or badminton, or a golf club used in golf. Thus, the configuration illustrated as the embodiment mentioned above can be also applied to a ball hitting tool used in a sport in which a subject swings.

In the embodiment mentioned above, swing analysis device 10 may display the swing trajectory as in FIG. 8B and the like as the calculation result of the swing trajectory, or may display the time-series head velocity and the maximum head velocity as shown in FIGS. 12A and 12B as the calculation result of the head velocity. Moreover, swing analysis device 10 may display the number of swings performed by the subject.

It should be noted that a program for performing the control described in the above-described flowcharts by operating a computer can also be provided. Such a program can be stored in a non-transitory computer readable storage medium and can be provided as a program product. Examples of the non-transitory computer readable storage medium includes a flexible disk attached to the computer, a CD-ROM (Compact Disk Read Only Memory), a ROM, a RAM, a memory card, and the like. Alternatively, the program can be provided by recording it in a storage medium such as a hard disk provided in the computer. Alternatively, the program can also be provided through download via a network.

The program may be configured to invoke a necessary module of program modules, which are provided as part of the operating system (OS) of the computer, at a predetermined timing and cause execution of a process. In that case, the above module is not included in the program and the process is performed in cooperation with the OS. Such a program including no module can be also included in the program according to the present embodiment.

Moreover, the program according to the present embodiment may be incorporated in part of another program and may be provided. Also in that case, the program itself does not include a module included in the other program, and the process is performed in cooperation with the other program. Such a program incorporated in the other program can also be included in the program according to the present embodiment.

The configuration illustrated as the above-described embodiment is an exemplary configuration of the present invention, can be combined with another known technique, and can be configured in a different manner without deviating from the gist of the present invention, for example, can be configured such that some components are omitted.

Effect of Embodiment

According to the present embodiment, even when the subject swings for a plurality of times continuously for a long time, swing trajectory and head velocity can be precisely calculated for each swing. This can eliminate an extra effort of resetting the sensor device to correct measurement errors (drift error and the like) caused by performing a larger number of swings, for example. Accordingly, the subject can only focus on swings.

According to the present embodiment, only the sensor device is attached to the bat. Hence, it can be readily utilized in various scenes such as swing check at home of the subject and swing check for a club member by a supervisor or the like.

Moreover, according to the present embodiment, since it is not necessary to use a geomagnetic field sensor for correcting a drift error or the like, cost reduction as a whole of system can be achieved.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A swing analysis device for analyzing a plurality of swings of a ball hitting tool, the swing analysis device comprising:
an information input unit configured to receive input of acceleration information and angular velocity information detected by a sensor attached to the ball hitting tool; and
a swing analysis unit configured to analyze, for each of the plurality of continuous swings, the swing during a certain period from a first time preceding a predetermined time of the swing to a second time after the predetermined time, wherein the predetermined time is a time at which a velocity of the ball hitting tool, which is calculated based on the angular velocity information, reaches a predetermined threshold value, the swing analysis unit including a posture calculation unit configured to calculate posture information of the ball hitting tool in the certain period by applying a predetermined filter to the acceleration information and the angular velocity information, wherein the posture information includes a first rotation matrix for conversion from a sensor coordinate system to a global coordinate system, and the first rotation matrix is obtained by converting a quaternion indicating a posture of the ball hitting tool;
a correction unit configured to correct the first rotation matrix of the ball hitting tool in the certain period based on the first rotation matrix of the ball hitting tool at particular time in the certain period; and
a swing information calculation unit configured to calculate a swing trajectory of the ball hitting tool in the certain period based on the acceleration information and the first rotation matrix of the ball hitting tool corrected by the correction unit,
wherein the particular time is a time at which the velocity of the ball hitting tool, which is calculated based on the angular velocity information, is at a maximum in the certain period.

2. The swing analysis device according to claim 1, further comprising a number calculation unit configured to calculate the number of swings of the ball hitting tool based on the number of times the velocity of the ball hitting tool calculated based on the angular velocity information reaches a predetermined velocity.

3. The swing analysis device according to claim 1, wherein the swing information calculation unit further calculates a maximum velocity of a head of the ball hitting tool in the certain period based on the acceleration information and the posture information of the ball hitting tool corrected by the correction unit.

4. The swing analysis device according to claim 1, wherein the predetermined filter includes an extended Kalman filter.

5. The swing analysis device according to claim 1, wherein the correction unit is configured to correct the first rotation matrix by multiplying the first rotation matrix by a transposed matrix of a second rotation matrix indicating rotation around a vertical direction at the specific time.

6. A non-transitory computer-readable storage medium storing a program for causing a computer to analyze a plurality of swings of a ball hitting tool, the program causing the computer to perform:
receiving input of acceleration information and angular velocity information detected by a sensor attached to the ball hitting tool; and
analyzing, for each of the plurality of continuous swings, the swing for a certain period from a first time before a predetermined time of the swing to a second time after the predetermined time, wherein the predetermined time is a time at which a velocity of the ball hitting tool, which is calculated based on the angular velocity information, reaches a predetermined threshold value, the analyzing including:
calculating posture information of the ball hitting tool in the certain period by applying a predetermined filter to the acceleration information and the angular velocity information, wherein the posture information includes a first rotation matrix for conversion from a sensor coordinate system to a global coordinate system, and the first rotation matrix is obtained by converting a quaternion indicating a posture of the ball hitting tool;
correcting the first rotation matrix of the ball hitting tool in the certain period based on the posture information of the ball hitting tool at a particular time in the certain period; and
calculating a swing trajectory of the ball hitting tool in the certain period based on the acceleration information and the corrected first rotation matrix of the ball hitting tool,
wherein the particular time is a time at which the velocity of the ball hitting tool, which is calculated based on the angular velocity information, is at a maximum in the certain period.

7. A swing analysis system comprising:
a sensor attached to a ball hitting tool; and
a swing analysis device configured to analyze a plurality of swings of the ball hitting tool,
the swing analysis device including:
an information input unit configured to receive input of acceleration information and angular velocity information detected by the sensor attached to the ball hitting tool; and
a swing analysis unit configured to analyze, for each of the plurality of swings, the swing for a certain period from a first time preceding a predetermined time to a second time after the predetermined time, wherein the predetermined time is a time at which a velocity of the ball hitting tool, which is calculated based on the angular velocity information, reaches a predetermined threshold value, the swing analysis unit including:
a posture calculation unit configured to calculate posture information of the ball hitting tool in the certain period by applying a predetermined filter to the acceleration information and the angular velocity information, wherein the posture information includes a first rotation matrix for conversion from a sensor coordinate system to a global coordinate system, and the first rotation matrix is obtained by converting a quaternion indicating a posture of the ball hitting tool;
a correction unit configured to correct the first rotation matrix of the ball hitting tool in the certain period based on the first rotation matrix of the ball hitting tool at a particular time in the certain period, and a swing information calculation unit configured to calculate a swing trajectory of the ball hitting tool in the certain period based on the acceleration information and the first rotation matrix of the ball hitting tool corrected by the correction unit, wherein the particular time is a time at which the velocity of the ball hitting tool, which is calculated based on the angular velocity information, is at a maximum in the certain period.

* * * * *